(12) United States Patent
Zaltzman et al.

(10) Patent No.: US 9,460,219 B2
(45) Date of Patent: Oct. 4, 2016

(54) SELECTION AND RATING OF LOCATIONS AND RELATED CONTENT BASED ON USER CATEGORIZATION

(71) Applicant: Gogobot, Inc., Menlo Park, CA (US)

(72) Inventors: Ori Zaltzman, Menlo Park, CA (US); Travis Katz, Menlo Park, CA (US)

(73) Assignee: Gogobot, Inc., Menlo Park, CA (US)

( * ) Notice: Subject to any disclaimer, the term of this patent is extended or adjusted under 35 U.S.C. 154(b) by 315 days.

(21) Appl. No.: 14/171,521

(22) Filed: Feb. 3, 2014

(65) Prior Publication Data
US 2015/0220544 A1 Aug. 6, 2015

(51) Int. Cl.
*G06F 7/00* (2006.01)
*G06F 17/30* (2006.01)

(52) U.S. Cl.
CPC .................................. *G06F 17/3087* (2013.01)

(58) Field of Classification Search
CPC ...................... G06F 17/30864; G06F 17/3087; G06F 17/30867
USPC ................. 707/748, 749, 758, 706, 722, 723
See application file for complete search history.

(56) References Cited

U.S. PATENT DOCUMENTS

| 2007/0233671 | A1* | 10/2007 | Oztekin | G06F 17/30867 |
| 2009/0210276 | A1* | 8/2009 | Krumm | G06Q 10/025 705/7.33 |
| 2011/0213787 | A1* | 9/2011 | Cerny | G06F 17/30867 707/749 |
| 2012/0215773 | A1* | 8/2012 | Si | G06Q 30/02 707/723 |

* cited by examiner

*Primary Examiner* — Md. I Uddin
(74) *Attorney, Agent, or Firm* — Fenwick & West LLP

(57) ABSTRACT

Targeted location-based search results can be provided to a user of a travel system based on one or more tribes of users to which the user belongs. A user can provide a search query, and a set of locations can be identified in response. A subset of the set of locations is selected for display based on a correlation between a tribe vector associated with the user and tribe vectors associated with each identified location. A user can also request content objects from the travel system, for instance by navigating to a page associated with a location including portions for displaying content objects. A set of content objects is identified in response to a request for content, and a subset of the content objects is selected for display based on a correlation between the tribe vector associated with the user and tribe vectors associated with each content object.

19 Claims, 6 Drawing Sheets

SELECTION AND RATING OF LOCATIONS AND RELATED CONTENT BASED ON USER CATEGORIZATION

BACKGROUND

This invention relates to digital search and content retrieval, and more specifically to the selection and rating of locations and location-related content for display in a travel information system and database.

Websites dedicated to travel allow users the ability research and plan for upcoming trips. For instance, a user can select a destination that the user is interested in visiting (such as Italy), and can discover cities, hotels, restaurants, and tourist attractions within the location. Such websites, applications, and other travel-oriented portals (referred to herein as "travel systems") can mine travel-specific information from the activities of users within the travel systems. However, such travel systems, in selecting content for display to users, do not take full advantage of travel-specific information, resulting in the display of less-relevant content, and a less favorable experience for the users.

Figure 1:
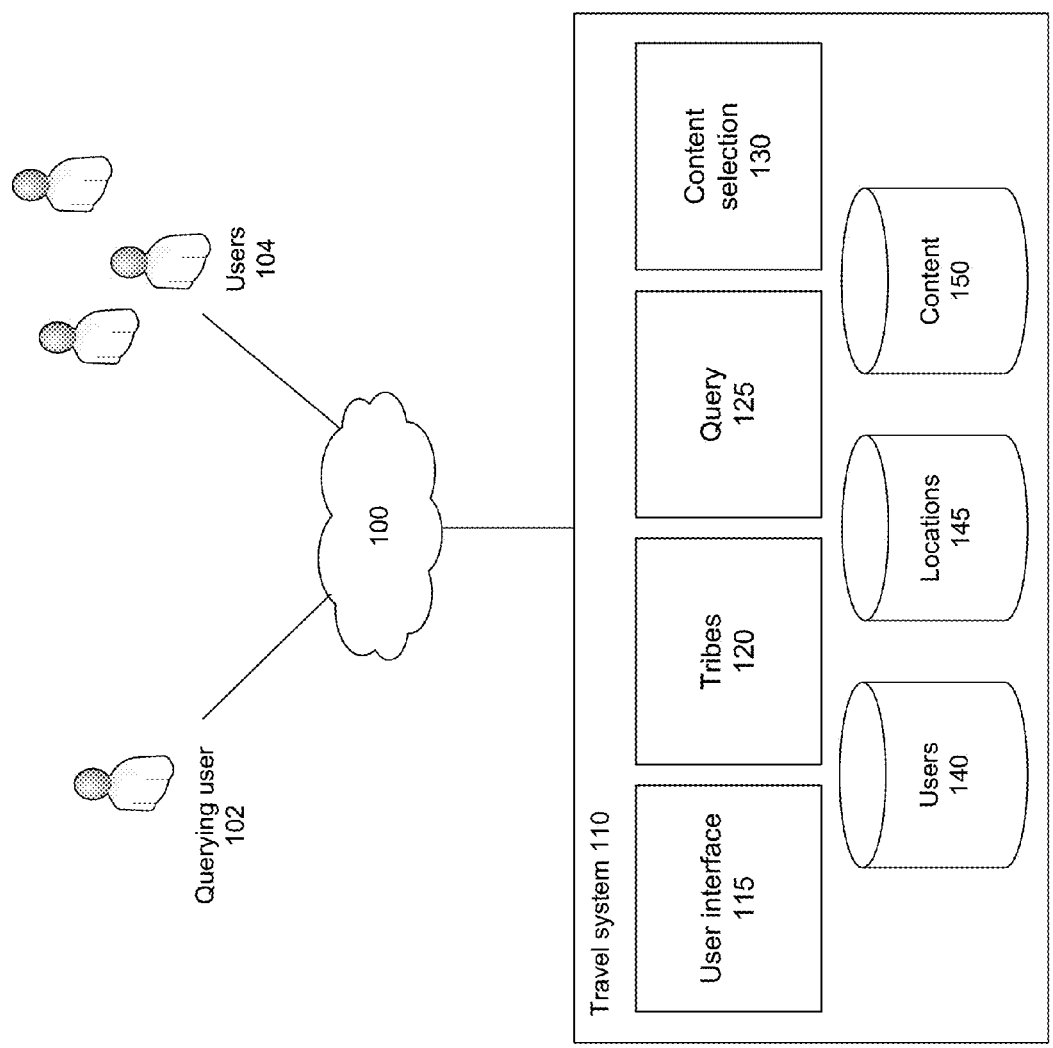
FIG. 1 is a network diagram of a system environment for selecting locations and content objects based on tribe vectors for display in a travel system, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Users of travel systems can prioritize different types and aspects of travel. For instance, some users can prioritize budget or low-cost travel, others can prioritize luxury travel, and others can prioritize family travel. A pre-determined categorization of users with a common travel preference is referred to herein as a "tribe." For instance, users that prioritize student travel are referred to herein as the "student" tribe. Accordingly, each tribe of users is associated with a travel category (or "tribe category" herein). Examples of tribe categories include, but are not limited to: budget travel, luxury travel, business travel, family travel, singles travel, student travel, wedding travel, honeymoon travel, bachelor/bachelorette travel, food travel, trendster travel, nightlife travel, adventure travel, outdoor activity travel, art & design travel, backpack travel, environmentally friendly or "green" travel, history travel, lesbian/gay/bisexual/transgender or "LGBT" travel, local culture travel, spiritual travel, vegetarian travel, wellness travel, and the like.

A set of weights can be determined for a user, indicating the user's preferences for each of one or more tribes. In some embodiments, each weight in the determined set of weights is a measure of affinity. For instance, if a user prioritizes student travel, the measure of affinity between the user and the student tribe can be determined to be 0.8 (on a scale of 0.0 to 1.0), and if the user does not prioritize family travel, the measure of affinity between the user and the family tribe can be determined to be 0.2. In some embodiments, for each user, a measure of affinity is determined between the user and every tribe. The measures of affinity for a user can be organized into an ordered set or a vector (referred to herein as a "tribe vector") associated with the user, with each entry of the tribe vector being a measure of affinity between the user and a particular tribe. It should be noted that the measures of affinity between a user and particular tribes can be determined independently. As a result, a user can be associated with identical or similar measures of affinity for tribes with seemingly contradicting priorities. For instance, a user can be associated with a measure of affinity of 0.65 for the budget tribe, and a measure of affinity of 0.63 for the luxury tribe.

It should be noted that for the purposes of simplicity, the remainder of this description will refer to the sets of weights determined for a user as a set of measures of affinity organized into a user tribe vector. Further, it should be noted that instead of determining a set of weights for a user, a set of weights can be determined for a particular location query or a content request. For instance, for a content request, a user can select a particular tribe with which to identify content. In such an embodiment, the selected tribe is not necessarily representative of the user's tribe preferences, and is instead used for a one-time content request.

Travel systems can organize travel information by location, and can include pages dedicated to locations. Examples of locations include countries, states, cities, towns, geographic areas, bodies of water, hotels, restaurants, spas, businesses, tourist attractions, museums, monuments, houses/lodges/cabins, and the like. Scores can be determined for locations, each representing a strength of association between a location and a tribe (hereinafter "tribe scores"). In some embodiments, such tribe scores are measures of affinity between a location and a tribe. The measures of affinity between locations and tribes can also be organized into location tribe vectors. Each entry of a location tribe vector associated with a location is a measure of affinity representing an affinity between a particular tribe and the location.

Travel systems can include content objects associated with locations, such as images, videos, ratings, scores, reviews, recommendations, itineraries, identities or usernames of users that have visited the locations, and the like. Content objects can include locations themselves. Such content objects can be displayed within pages dedicated to locations. For instance, for a page dedicated to the location "Rome, Italy", the page can include images taken of/in Rome, reviews and recommendations of hotels in Rome, a list of users that have visited Rome, and the like. Content objects may be created and uploaded by users.

Tribe scores can also be determined for content objects, with each tribe score representing a strength of association between a content object and a tribe. In some embodiments, such tribe scores are measures of affinity between a content object and a tribe. The measures of affinity between content objects and tribes can also be organized into tribe vectors. Each entry of a tribe vector associated with a content object is a measure of affinity representing an affinity between a particular tribe and the content object. It should be noted that for the purposes of simplicity, the remainder of this description will refer to a set of tribe scores determined for a location or content object as a set of measures of affinity organized into a location or content object tribe vector.

Tribe vectors can be used to improve the experience of a user of a travel system. For instance, tribe vectors can be used to select locations for display in response to a search query, and to order selected locations. In addition, tribe vectors can be used to select content objects for display within a location page or within another travel system page or context. The computing and use of tribe vectors in a travel system is described below in greater detail.

System Environment

FIG. 1 is a network diagram of a system environment for selecting locations and content objects based on tribe vectors for display in a travel system, in accordance with an embodiment of the invention. The system environment includes a querying user 102, one or more other users 104, and a travel system 110, each of which are communicatively coupled via the network 100. It should be noted that although the querying user and the other users are shown as directly coupled to the network 100, in practice the users access the travel system via one or more client devices (not shown in FIG. 1), such as a computer, mobile device, tablet, and the like.

The querying user 102 and the users 104 can each be associated with a travel system user account, can have a screen name associated with the user account, and can have a profile associated with the user account. A user profile can include information uploaded by the user, such as biographical information, images, and the like. A user profile can also include information associated with a user's travels, such as locations the user has visited, content objects associated with locations uploaded by the user, and the like. For the purpose of simplicity, the remainder of this description will presume that each of the users 104 has established a user profile and a user account. In addition, the remainder of this description will presume that the travel system 110 includes content objects associated with locations created or uploaded by the users 104. In practice, any number of users (such as hundreds or millions) can use the travel system, and can create or upload any number of content objects associated with any number of locations.

The querying user 102 can access the travel system 110 via the network 100, and can perform any number of functions associated with the travel system. For instance, the querying user may plan a trip using the travel system, create an itinerary, purchase airfare, and the like. The querying user can query the travel system to identify potential locations for visiting, and the travel system can present location results in response to the query. The querying user can visit a page associated with a location, can browse content objects (such as images and reviews) associated with the location, and can upload or create content objects for the location. The querying user can also interact with other users, can visit profile pages or other users, and the like.

The querying user 102 communicates with and accesses the travel system 110 via the network 100. The network may be a local area network, a wide area network, the internet, or any other network or combination of networks that allows communication between the entities of FIG. 1. The network may use standard communications technologies and/or protocols and may include wireless and/or wired communication protocols.

The travel system 110 can be a personal computer, a server, a data center, or any other computing device or system including a processor and configured to execute applications and/or computer instructions for performing the functionalities described herein. The travel system 110 includes a user interface module 115, a tribes module 120, a query module 125, a content selection module 130, a users storage module 140, a locations storage module 145, and a content storage module 150. It should be noted that in other embodiments, both the travel system specifically and the environment of FIG. 1 generally include additional components not illustrated in the embodiment of FIG. 1.

The users storage module 140 stores information associated with users of the travel system 110, such as profile page information, user account information, user biographical information, user history and preferences, and tribe vectors associated with users. The locations storage module 145 stores information associated with locations, such as geographical information, travel-related information, a location category (such as "city," "restaurant," and the like), and tribe vectors associated with locations. The content storage module 150 stores information associated with content objects, such as the content objects themselves (images, reviews, and the like), the identity of the location to which each content object is associated, the identity of the user that created or uploaded the content object, and tribe vectors associated with the content objects.

The user interface module 115 provides the communicative interface between users and the travel system 110. For instance, communications, such as search queries and requests for content, are received from the querying user 102 and are routed by the user interface module to the query module 125 and the content selection module 130, respectively. Likewise, content objects received from a user 104 are stored by the user interface module in the content storage module 150. Communications from the travel system to a user are also routed by the user interface module. For instance, location search results from the query module and content objects selected by the content selection module are routed to the querying user by the user interface module. The user interface module can present one or more interfaces (such as graphical user interfaces, webpage, application interfaces, and the like) to users accessing the travel system.

The tribes module 120 creates tribe vectors for users of the travel system 110, for locations, and for content objects, for instance based on information stored in the users storage module 140, the locations storage module 145, and the content storage module 150, respectively. Users, locations, and content objects are collectively referred to herein as "travel system entities." It will be assumed for the remainder of the description that a tribe vector is created for each user of the travel system, for each location tracked by the travel system, and for each content object stored by the travel system, though it should be emphasized that in other embodiments, tribe vectors are only determined for certain users, locations, and/or content objects.

The tribes module 120 creates a tribe vector for a travel system entity by determining a measure of affinity between the entity and each of a set of tribes, and by combining the determined measures of affinity into a vector. The tribes module can create a tribe vector for each travel system entity in advance of a received query or content request, upon the creation or uploading of an entity, in response to a search query or request for content received from a user, or in response to any other suitable event. The remainder of this description will presume that tribe vectors are computed for each entity in advance of receiving a query or content request.

The tribes module 120 can determine measures of affinity for a user based on the preferences of the user. A user can select a priority for each tribe, and a measure of affinity can be determined for each tribe based on the user priority selection. For example, a user can select the "luxury" tribe as high priority, the "family" tribe as medium priority, and the "student" tribe as low priority. In response, the tribes module can determine a measure of affinity of 0.8 for the luxury tribe, 0.5 for the family tribe, and 0.2 for the student tribe. In some embodiments, users can select measures of affinity for tribes directly, for instance by entering a score between 0 and 100 for each tribe, or by adjusting a slider bar or dial that adjusts a measure of affinity for a particular tribe.

The tribes module 120 can also determine measures of affinity for a user indirectly based on actions of the user. In such instances, measures of affinity can be determined based on tribes associated with a location. For example, if a user navigates to locations associated with a first set of tribes more often than if the user navigates to locations associated with a second set of tribes, the measures of affinity between the user and the first set of tribes can be greater than the measures of affinity between the user and the second set of tribes. Similarly, for content objects created or uploaded by a user in association with particular locations, measures of affinity can be determined for the user based on the tribes associated with the locations. Further, measures of affinity can be determined based on the user's check-ins to particular locations (the use of location-detection functionality on a device by a user to indicate the presence of the user at a location), a user's prior travel to particular locations, and the like.

The tribes module 120 can also determine measures of affinity for a user based on characteristics of the user. For example, if a user is friends with or has otherwise established a connection with other users associated with high measures of affinity with a first set of tribes and/or low measures of affinity with a second set of tribes, the tribes module can determine high measures of affinity between the user and the first set of tribes and/or low measures of affinity with a second set of tribes. Further, measures of affinity can be determined based on biographical information provided by the user. For instance, if the user indicates that he is a student, a high measure of affinity can be determined between the user and the "student" tribe, and a low measure of affinity can be determined between the user and the "luxury" tribe. Finally, measures of affinity can be determined for a user based on common characteristics between the user and other users. For instance, if a set of users with a common characteristic (such as age, education, profession, family or relationship status, and the like) is associated with high or low measures of affinity for particular tribes, then similar measures of affinity can be determined for the particular tribes for a user sharing the common characteristic.

The tribes module 120 can determine measures of affinity for a user based additionally on the actions of other users. For example, if a user is indicated by other users as an expert in a particular type of travel (such as "family" travel), the tribes module can determine a measure of affinity for the user based on the indication. In addition, if a set of users associated with particular tribes frequently communicate with or interact with a user, the tribes module can determine measures of affinity for the particular tribes for the user based on the communications or interactions.

The tribes module 120 can determine measures of affinity for locations. Measures of affinity can be determined for a location based on the measures of affinity of users that navigate to, check-in to, or otherwise interact with a page associated with the location. Measures of affinity for a location can be determined based on an association of the location with particular tribes by users ("tags"). For example, if more users tag a restaurant as "budget" than "luxury," the measure of affinity between the location and the budget tribe can be higher than between the location and the luxury tribe. Measures of affinity for a location can also be computed based on the manual association of particular tribes by trusted users, by travel system editors, or by individuals associated with the location itself (such as owners or employees).

The tribes module 120 can determine measures of affinity for content objects created or uploaded by users. In one embodiment, the measures of affinity between a particular content object and various tribes are the same as or similar to the measures of affinity between the user that created or uploaded the content object and the various tribes. Measures of affinity for a content object can also be determined based on the measures of affinity between the location to which the content object is associated and various tribes. Measures of affinity for a content object can also be determined based on characteristics of the content object. For example, if the content object includes the words "expensive" or "opulent," a higher measure of affinity can be determined for the "luxury" tribe than for the "budget" tribe. In addition, measures of affinity for a content object can also be determined based on tags of the content object with particular tribes, for instance by the user that created or uploaded the content object, or by users that view or access the content object.

It should be emphasized that measures of affinity determined by the tribes module 120 can be determined based on any combination of the factors described herein, or based on additional factors not described herein. For instance, the tribes module can mine data from external entities or web pages, from social networks, and the like to determine measures of affinity between travel system entities and tribes. Further, tribe vectors can be updated periodically, in response to certain actions taken by the users, or in real-time. It is presumed that ordering of the measures of affinity within the tribe vectors is substantially similar between travel system entities, with a particular entry of each tribe vector associated with one of a pre-determined set of tribes. Further, the tribe module can normalize measures of affinity associated with a particular tribe based on the number of users, locations, or content objects associated with measures of affinity for the tribe above a pre-determined threshold. For example, if the distribution of measures of affinity for a first tribe is skewed towards the bottom of a measure of affinity range, the measures of affinity can be normalized such that the distribution of the measures of affinity for the first tribe is more similar to the distribution of measures of affinity for a second tribe.

Figure 2:
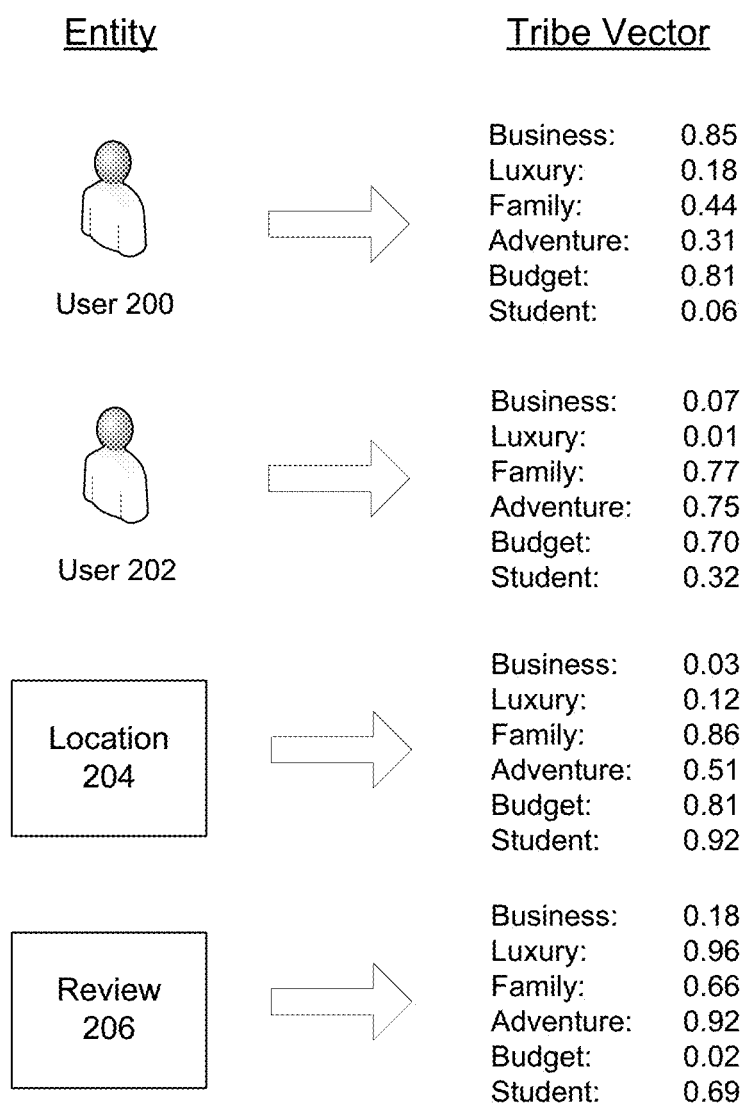
FIG. 2 illustrates example tribe vectors for various entities, in accordance with an embodiment of the invention.

FIG. 2 illustrates example tribe vectors for various entities, in accordance with an embodiment of the invention. The tribe vectors of FIG. 2 include ordered measures of affinity between an entity and each of six tribes. These tribes are, in order: a business tribe, a luxury tribe, a family tribe, an adventure tribe, a budget tribe, and a student tribe. In other words, a particular position within each vector represents the affinity score between an associated entity and one of the six tribes. The four entities of FIG. 2 are user 200, user 202, location 204, and review 206. The tribe vector for user 200 can be written as the vector $T_{200}=[0.85, 0.18, 0.44, 0.31, 0.81, 0.06]$, can be displayed as a histogram, or can be represented in any other suitable method. Although the measures of affinity illustrated in FIG. 2 and described herein are numerical and between the values of 0 and 1, it should be emphasized that any data type or value can be used to represent measures of affinity for the purposes described herein.

Returning to the environment of FIG. 1, the query module 125 receives, via the user interface module 115, a location search query from the querying user 102. In response to receiving the search query, the query module queries the locations storage module 145 to identify a set of locations that satisfy the criteria of the received search query. For example, the query module can query the locations storage module to identify locations stored in the locations storage module associated with text or with a category associated with the received search query. In some embodiments, the received search query represents a search for locations generally (such as vacation locations), or for locations of a particular type. For example, the querying user can perform a search for cruise destinations, for restaurants within a geographic area, for tourist attractions within a particular city, and the like. The query module identifies a set of locations that match the received query. For instance, if the received query represents a search for restaurants in Northern California, the query module can query the locations storage module to identify a set of restaurants in Northern California. Likewise, if the received query represents a search for hotels in Rome, the query module can query the locations storage module to identify a set of hotels in Rome. In addition to identifying a set of locations in response to the received query, the query module also accesses the tribe vectors associated with each of the identified set of locations. The query module also accesses a tribe vector associated with the querying user 102 from the users storage module 140.

The query module 125 selects a subset of locations from the identified set of locations for display to the querying user 102. By selecting the most relevant subset of locations for display, the travel system 110 beneficially improves the experience of the querying user in identifying locations most suitable or interesting to the querying user. The query module uses the accessed tribe vector associated with the querying user and the accessed tribe vectors associated with the identified set of locations to identify the most relevant locations within the identified set of locations. In one embodiment, the query module identifies one or more tribes associated with the highest measures of affinity within the tribe vector associated with the querying user, and selects locations from the identified set of locations based on the values of the measures of affinity for the identified one or more tribes in the tribe vectors associated with the identified set of locations. For instance, if the greatest measure of affinity of a querying user's tribe vector is an affinity between the querying user and the "luxury" tribe, the query module can select a threshold number of locations from the identified set of locations including the highest measures of affinity for the luxury tribe.

The query module 125 can also select a subset of locations from the identified set of locations based on other measures of similarity between the tribe vector associated with the querying user 102 and the tribes vectors associated with the identified set of locations. In one embodiment, the query module determines, for each location in the set of locations, a measure of correlation between the tribe vector associated with the user and the tribe vector associated with the location, such as a dot product or other suitable measure. In this embodiment, the query module can select a subset of locations for display based on the determined measures of correlation, for instance, a threshold number of locations associated with the highest measures of correlation. Any other suitable measure of similarity can be used to identify the most relevant locations for display, for instance the cross-correlation between a user's tribe vector and a location tribe vector, the minimum entropy between the user's tribe vector and a location tribe vector, and the like.

The query module 125, in response to selecting a subset of the identified set of locations, can display the selected subset of locations to the querying user 102. In some embodiments, the selected subset of locations can be ordered by location type, by location popularity or rating, or by a strength of keyword match between a user's query and text associated with each location. The query module can also order the selected subset of locations based on the determined measures of similarity between the tribe vector associated with the querying user and the tribe vectors associated with the selected locations. For instance, if the subset of locations is selected based on the dot product between the user's tribe vector and the tribe vectors associated with the identified set of locations, then the locations in the subset of locations can be ordered from greatest dot product to smallest dot product.

In some embodiments, instead of computing a measure of correlation between a user tribe vector and each location tribe vector, the query module 125 determines an overall score for each location in the set of locations based on a set of weights associated with a location query and a set of tribe scores associated with each location in the set of locations. In such embodiments, the query module can rank the locations based on the determined overall scores, and can select a subset of the locations based on the ranking of locations.

Figure 3:
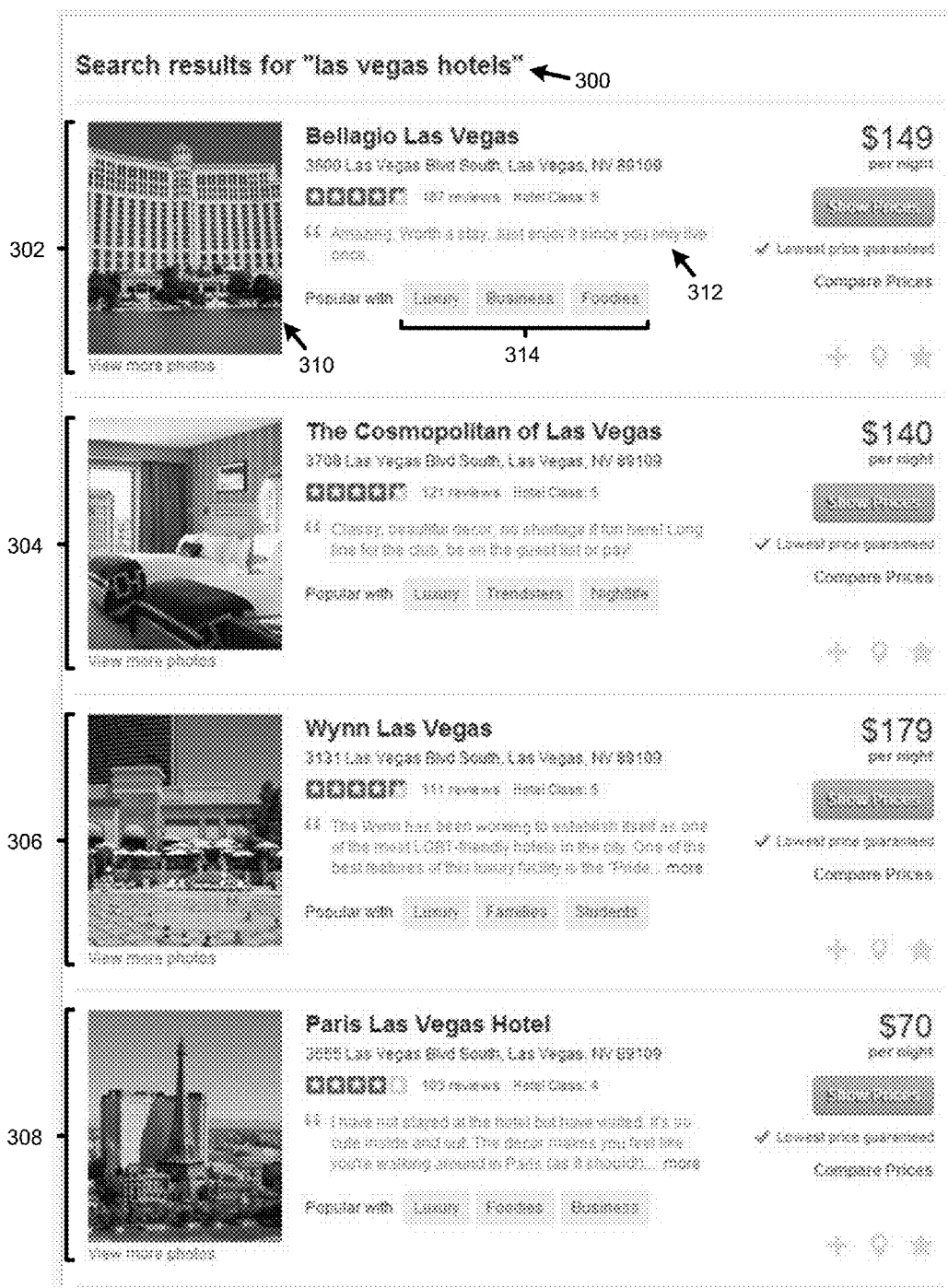
FIG. 3 illustrates the display of locations selected based on tribe vectors in response to a search query, in accordance with an embodiment of the invention.

FIG. 3 illustrates the display of locations selected based on tribe vectors in response to a search query, in accordance with an embodiment of the invention. In the embodiment of FIG. 3, a querying user 102 associated with a tribe vector that includes a large measure of affinity for the "luxury" tribe enters the search query "las vegas hotels" 300 into a website associated with the travel system 110. In response, the query module 125 identifies a set of hotels located in Las Vegas, Nev., and further selects a subset of hotels (hotels 302, 304, 306, and 308) based on the tribe vector associated with the querying user and tribe vectors associated with the identified set of hotels. Each of the selected subset of hotels is associated with a tribe vector with a greatest measure of affinity for the luxury tribe. The selected subset of hotels are displayed by the query module, and are ordered within the display by rating. The display of each hotel further includes a photo 310 associated with the hotel, a review 312 associated with the hotel, tribes 314 associated with the greatest measures of affinity within the tribe vector associated with the hotel, address information, price information, rating information, and the like.

Returning to the environment of FIG. 1, the content selection module 130 receives, via the user interface module 115, a request for content objects from the querying user 102. In response to receiving the request for content objects, the content selection module queries the content storage module 150 to identify a set of content objects based on the request. For example, the content selection module can query the content storage module to identify content objects stored in the content storage module associated with text or with a category associated with the request for content. The request for content can be explicit, for instance if a user selects a link configured to display photographs of a monument. In such embodiments, the content selection module identifies photographs associated with the monument. The request for content can also be implicit, for instance if a querying user accesses a page associated with a particular location, and the page includes fields or portions configured to display content objects associated with the location. In such embodiments, the content selection module identifies content objects associated with a location in response to the querying user accessing the page associated with the location. The content selection module also accesses a tribe vector associated with each identified content object from the content storage module, and accesses a tribe vector associated with the querying user from the users storage module 140.

The content selection module 130 selects a subset of content objects from the identified set of content objects for display to the querying user 102. As with before, selecting the most relevant subset of content objects for display beneficially improves the querying user's experience in using the travel system 110. The content selection module uses the accessed tribe vector associated with the querying user and the accessed tribe vectors associated with the identified set of content objects to identify the most relevant content objects within the identified set of content objects. In one embodiment, the content selection module identifies one or more tribes associated with the highest measures of affinity within the tribe vector associated with the querying user, and selects content objects from the identified set of content objects based on the values of the measures of affinity for the identified one or more tribes in the tribe vectors associated with the identified set of content objects. For instance, if the greatest measure of affinity of a querying user's tribe vector is an affinity between the querying user and the "family" tribe, the query module can select a threshold number of content objects from the identified set of content objects including the highest measures of affinity for the family tribe.

The content selection module 130 can also select a subset of content objects from the identified set of content objects based on other measures of similarity between the tribe vector associated with the querying user 102 and the tribes vectors associated with the identified set of content objects. Similarly to the query module 125, the content selection module can determine, for each content object in the set of content objects, a measure of correlation between the tribe vector associated with the user and the tribe vector associated with the content object, such as a dot product or other suitable measure. In this embodiment, the content selection module can select a subset of content objects for display based on the determined measures of correlation, for instance, a threshold number of content objects associated with the highest measures of correlation. Any other suitable measure of similarity can be used to identify the most relevant content objects for display, for instance the cross-correlation between a user's tribe vector and a content object tribe vector, the minimum entropy between the user's tribe vector and a content object tribe vector, and the like.

The content selection module 125, in response to selecting a subset of the identified set of content objects, can display the selected subset of content objects to the querying user 102. In some embodiments, the selected subset of content objects can be ordered by content object type, by a strength of keyword match between a user's query and text associated with each content object, or the like. The content selection module can also order the selected subset of content objects based on the determined measures of similarity between the tribe vector associated with the querying user and the tribe vectors associated with the selected content objects. For instance, if the subset of content objects is selected based on the dot product between the user's tribe vector and the tribe vectors associated with the identified set of content objects, then the content objects in the subset of content objects can be ordered from greatest dot product to smallest dot product.

In some embodiments, instead of computing a measure of correlation between a user tribe vector and each content object tribe vector, the content selection module 130 determines an overall score for each content object in the set of content objects based on a set of weights associated with a content request and a set of tribe scores associated with each content object in the set of content objects. In such embodiments, the content selection module can rank the content objects based on the determined overall scores, and can select a subset of the content objects based on the ranking of content objects.

Figure 4:
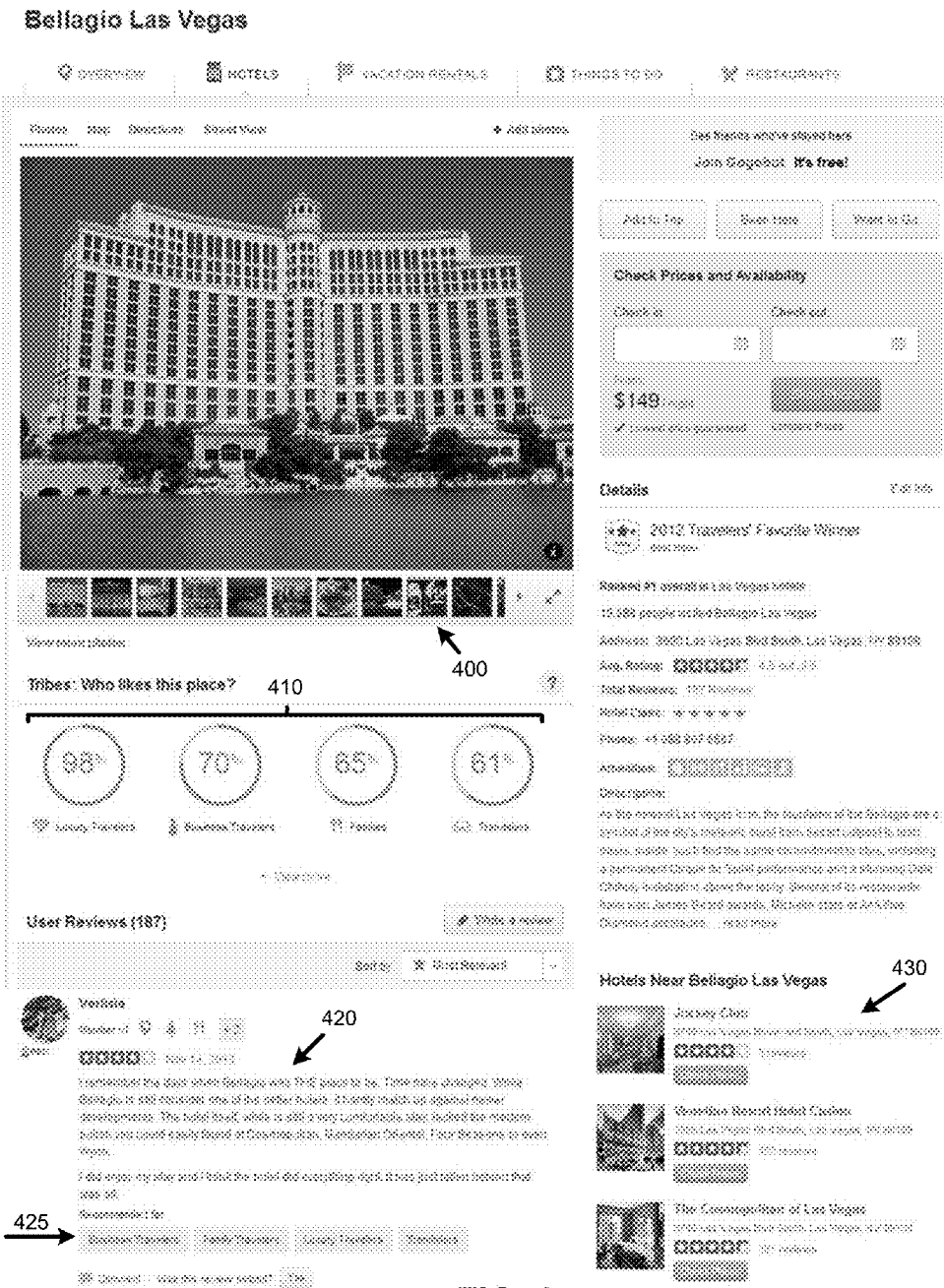
FIG. 4 illustrates the display of content objects selected based on tribe vectors within a location page, in accordance with an embodiment of the invention.

FIG. 4 illustrates the display of content objects selected based on tribe vectors within a location page, in accordance with an embodiment of the invention. The location page of FIG. 4 is associated with the location "The Bellagio Las Vegas," a hotel within Las Vegas, Nev. The location page includes several portions configured to display content objects, such as images 400 associated with the Bellagio and a review 420 associated with the Bellagio. In response to a querying user 102 accessing the page of FIG. 4, the content selection module 130 identifies a set of images associated with the Bellagio, and selects a subset of images from the identified set of images based on the tribe vector associated with the querying user and the tribe vectors associated with the identified set of images. For example, the content selection module can select images for display associated with tribe vectors that result in an above-threshold dot product with the tribe vector associated with the querying user. Similarly, the content selection module can identify a set of reviews associated with the Bellagio, and can select a review from the identified set of reviews based on a measure of correlation between the tribe vector associated with the identified set of reviews and the tribe vector associated with the querying user.

The location page of FIG. 4 further includes measures of affinity 410 between various tribes and the location "The Bellagio Las Vegas," such as a measure of affinity of 98% for the luxury tribe, a measure of affinity of 70% for the business tribe, and so on. The location page of FIG. 4 also includes tribes 425 with which the displayed review 420 has been tagged or is otherwise associated with, for instance the tribes associated with the greatest measures of affinity in the tribe vector associated with the display review. The location page of FIG. 4 also includes recommendations for hotels 430 near the Bellagio, which can be selected based on a similarity between tribe vectors associated with the hotels 430 and a tribe vector associated with the location "The Bellagio Las Vegas" or the querying user 102. Finally, the location page also includes rating information, price information, geographic information, and the like.

A landing page can be displayed by the travel system 110 to a querying user 102, for instance when the querying user initially accesses the travel system, or when the querying user navigates to a home page portion of the travel system. The landing page can be populated with content objects based on the tribe vector associated with the querying user. For instance, if the tribe vector associated with the querying user includes high measures of affinity between the LGBT tribe, the luxury tribe, and the business tribe, content objects associated with tribe vectors including high measures of affinity for one or more of three tribes can be selected and displayed on the landing page. In some embodiments, a querying user can view different landing pages by selecting a "lens" (a tribe vector associated with a particular type of user, such as a user strongly associated with the "student" tribe, a user strongly associated with the "family" tribe, and the like), and the travel system can select locations and content objects for display in a landing page based on the selected lens.

Similarly, locations and/or content objects can be selected by the travel system 110 for recommendation to the querying user 102 based on a correlation or similarity between the tribe vector associated with the querying user and tribe vectors associated with locations and content objects. In one embodiment, locations and/or content objects selected for recommendation to the querying user are displayed on a landing page, or within portions of other pages displayed by the travel system. Alternatively, locations and/or content objects selected for recommendation can be emailed to a querying user, presented within an application associated with the travel system, used to target advertising to the querying user, and the like.

Tribe vectors associated with travel system entities can be displayed within the travel system 110. For instance, a tribe vector associated with a user can be displayed in a profile page associated with a user or within any other interface associated with the user. Similarly, tribe vectors associated with locations and content objects can be displayed in dedicated pages or interfaces associated with the locations and content objects, respectively. Displaying a tribe vector can include displaying a histogram representative of the tribe vector (with each histogram bar associated with a particular tribe, and with the height of the bar representative of the measure of affinity associated with the tribe). Tribe vectors can also be displayed in any other suitable form, for instance by displaying numerical values representative of the measures of affinity included in the tribe vectors, by displaying heat maps emphasizing tribes associated with the highest measures of affinity and de-emphasizing tribes associated with the lowest measures of affinity, and the like.

Operation

Figure 5:
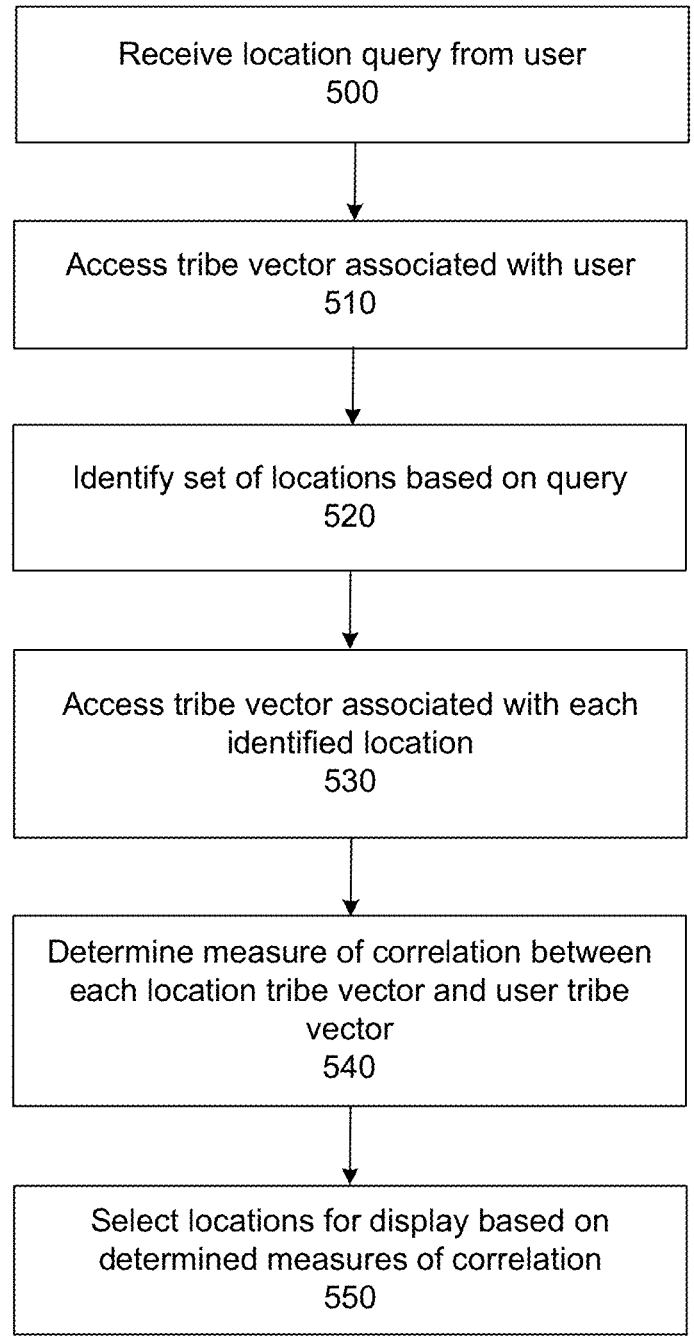
FIG. 5 is a flowchart of a process for selecting locations for display in response to receiving a search query, in accordance with an embodiment of the invention.

FIG. 5 is a flowchart of a process for selecting locations for display in response to receiving a search query, in accordance with an embodiment of the invention. In the embodiment of FIG. 5, a location query is received 500 from a querying user. For instance, the location query can include a keyword search for a particular type of location, such as the search query "Hotels in Barcelona." A tribe vector associated with the querying user is accessed 510. For example, a tribe vector can be computed for the querying user in response to receiving the query, or a pre-computed tribe vector associated with the querying user can be retrieved in response to receiving the query.

A set of locations is identified 520 based on the query. Locations can be identified based on a category included in the received query, based on a keyword match between the received query and text associated with locations, and the like. A tribe vector associated with each location is accessed 530. As with the tribe vector associated with the querying user, the tribe vectors associated with each location can be computed in response to receiving the query, or can be pre-computed and retrieved in response to receiving the query.

A measure of correlation is determined 540, for each identified location, between the tribe vector associated with the location and the tribe vector associated with the querying user. Each determined measure of correlation can be a dot product between tribe vectors, a cross-correlation between tribe vectors, or any other measure of relatedness or similarity. A subset of the set of locations can be selected 550 for display based on the determined measures of correlation. For instance, a threshold number of locations associated with the highest determined measures of correlation can be selected and displayed as a set of search results.

Figure 6:
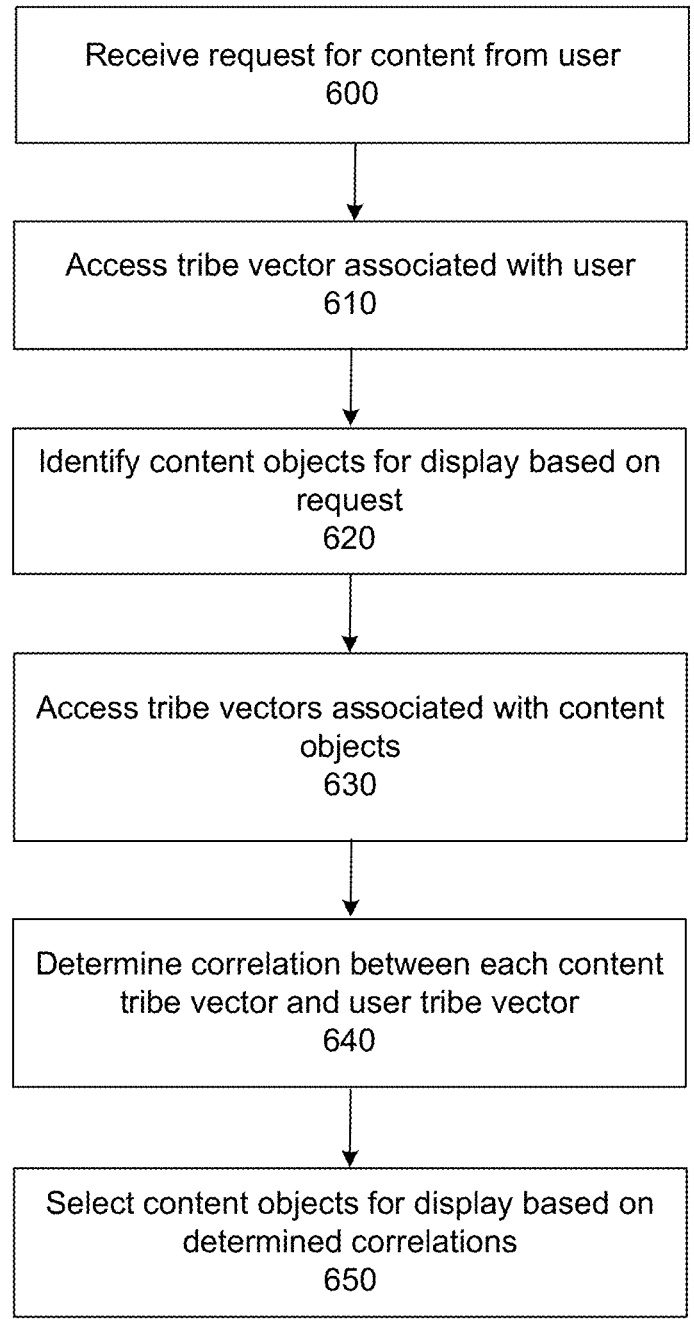
FIG. 6 is a flowchart of a process for selecting content for display in response to receiving a request for content, in accordance with an embodiment of the invention.

FIG. 6 is a flowchart of a process for selecting content for display in response to receiving a request for content, in accordance with an embodiment of the invention. In the embodiment of FIG. 6, a request for content is received 600 from a requesting user. For instance, the request for content can be a request from the requesting user to access a webpage associated with a location, or a request from the requesting user to view reviews or images associated with a location. A tribe vector associated with the requesting user is accessed 610. For example, a tribe vector can be computed for the requesting user in response to receiving the request, or a pre-computed tribe vector associated with the requesting user can be retrieved in response to receiving the request.

A set of content objects is identified 620 based on the request. Content objects can be identified based on a content object type associated with the received request (e.g., images or reviews), based on a location associated with the request (such as review associated with the location), and the like. A tribe vector associated with each content object is accessed 630. As with the tribe vector associated with the requesting user, the tribe vectors associated with each content object can be computed in response to receiving the request, or can be pre-computed and retrieved in response to receiving the request.

A measure of correlation is determined 640, for each identified content object, between the tribe vector associated with the content object and the tribe vector associated with the requesting user. As described above, each determined measure of correlation can be a dot product between tribe vectors, a cross-correlation between tribe vectors, or any other measure of relatedness or similarity. A subset of the set of content objects can be selected 650 for display based on the determined measures of correlation. For instance, the content object associated with the highest determined measure of correlation can be selected and displayed within a page associated with the received request.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for selecting content for display to a user in a travel system, the method comprising:
   maintaining a plurality of tribes, each tribe comprising a predefined categorization of users of the travel system;
   receiving a request for content from the user;
   accessing a user tribe vector comprising a set of weights associated with the request for content, each weight comprising a measure of the user's interest in a different tribe of the plurality of tribes;
   identifying a set of content objects based on the received request;
   for each identified content object:
      accessing a content tribe vector comprising a set of tribe scores associated with the identified content object, each tribe score representing a strength of association between the content object and a different tribe of the plurality of tribes; and
      determining, by a processor, an overall score for the identified content object based on a strength of correlation between the user tribe vector and the content tribe vector;
   ranking the content objects of the set of content objects based on the determined overall scores;
   selecting a threshold number of content objects from the set of content objects for display to the user as recommended content objects based on the ranking of content objects; and
   updating a display on a device associated with the user to display the selected threshold number of content objects.

2. The method of claim 1, wherein each predefined categorization of users is associated with a common travel-related characteristic.

3. The method of claim 1, wherein each weight in the set of weights comprises, for a tribe in the plurality of tribes, a measure of affinity between the user and the tribe.

4. The method of claim 3, wherein accessing a user tribe vector comprises retrieving a pre-computed user tribe vector.

5. The method of claim 3, wherein accessing a user tribe vector comprises computing a measure of affinity between the user and each of the one or more of the plurality of tribes.

6. The method of claim 1, wherein each tribe score in the set of tribe scores comprises, for a tribe in the plurality of tribes, a measure of affinity between the content object and the tribe.

7. The method of claim 6, wherein accessing a content object tribe vector associated with an identified content object comprises retrieving a pre-computed content object tribe vector.

8. The method of claim 6, wherein accessing a content object tribe vector associated with an identified content object comprises computing a measure of affinity between the identified content object and each of the one or more of the plurality of tribes.

9. The method of claim 1, wherein the one or more of the plurality of tribes comprises one tribe.

10. The method of claim 1, wherein the received request for content comprises a location query, and where the identified set of content objects comprises a set of locations.

11. The method of claim 10, wherein a location in the set of locations comprises one of: a city, a hotel, a restaurant, a park, a tourist attraction, a business, or a body of water.

12. The method of claim 10, wherein the selected subset of content objects is displayed to the user as a set of search results.

13. The method of claim 12, wherein the displayed subset of content objects are ordered within the set of search results based on the ranking of content objects in the subset of content objects.

14. The method of claim 1, wherein the received request for content comprises a request to access a travel system page associated with a location, the page comprising one or more portions dedicated to displaying content objects associated with the location.

15. The method of claim 1, wherein the received request for content comprises a request to view content objects in a dedicated travel system interface.

16. The method of claim 1, wherein a content object in the set of content objects comprises one of: an image, a video, a review, a rating, and a recommendation.

17. The method of claim 1, wherein the strength of correlation between the user tribe vector and the content tribe vector comprises a dot product between the user tribe vector and the content tribe vector.

18. The method of claim 1, wherein the plurality of tribes includes a tribe comprising a set of users associated with one of: a preference for budget travel, a preference for luxury travel, a preference for business travel, a preference for student travel, and a preference for family travel.

19. A non-transitory computer-readable method storing executable computer instructions for selecting content for display to a user in a travel system, the instructions configured to, when executed, perform steps comprising:
- maintaining a plurality of tribes, each tribe comprising a predefined categorization of users of the travel system;
- receiving a request for content from the user;
- accessing a user tribe vector comprising a set of weights associated with the request for content, each weight comprising a measure of the user's interest in a different tribe of the plurality of tribes;
- identifying a set of content objects based on the received request;
- for each identified content object:
  - accessing a content tribe vector comprising a set of tribe scores associated with the identified content object, each tribe score representing a strength of association between the content object and a different tribe of the plurality of tribes; and
  - determining an overall score for the identified content object based on a strength of correlation between the user tribe vector and the content tribe vector;
- ranking the content objects of the set of content objects based on the determined overall scores;
- selecting a threshold number of content objects from the set of content objects for display to the user as recommended content objects based on the ranking of content objects; and
- updating a display on a device associated with the user to display the selected threshold number of content objects.

* * * * *